United States Patent
Kim et al.

(10) Patent No.: US 9,560,148 B2
(45) Date of Patent: Jan. 31, 2017

(54) VEHICLE TERMINAL AND LOCATION-BASED CONTENT SHARING SYSTEM HAVING THE SAME

(71) Applicant: LG ELECTRONICS INC., Seoul (KR)

(72) Inventors: Taejun Kim, Seoul (KR); Junsic Park, Seoul (KR); Hyungnam Lee, Seoul (KR); Hyejin Yu, Seoul (KR); Byunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 14/148,108

(22) Filed: Jan. 6, 2014

(65) Prior Publication Data

US 2014/0195110 A1    Jul. 10, 2014

(30) Foreign Application Priority Data

Jan. 10, 2013  (KR) .................. 10-2013-0003040

(51) Int. Cl.
*G01C 21/00* (2006.01)
*H04L 29/08* (2006.01)
*G01C 21/36* (2006.01)

(52) U.S. Cl.
CPC ........... *H04L 67/18* (2013.01); *G01C 21/3697* (2013.01)

(58) Field of Classification Search
CPC ........ G06Q 30/02; G06Q 50/01; G06Q 10/10; G06Q 30/06; G06Q 30/0241; G06Q 30/0261; G06Q 10/02; G06Q 10/107; G06Q 30/0269; G06Q 10/06; H04W 64/00; H04W 4/023; H04W 4/026; H04W 4/027; H04W 4/22; H04W 84/18; H04W 88/06; H04W 12/06; H04W 24/10; H04W 28/26
USPC ........ 701/423, 426, 1, 2, 118, 302, 428, 516
See application file for complete search history.

(56) References Cited

U.S. PATENT DOCUMENTS

| | | | |
|---|---|---|---|
| 8,385,964 B2 * | 2/2013 | Haney | H04W 12/08 455/404.1 |
| 8,442,758 B1 * | 5/2013 | Rovik | G06Q 10/109 701/424 |
| 8,612,134 B2 * | 12/2013 | Zheng | G01S 19/14 701/400 |

(Continued)

FOREIGN PATENT DOCUMENTS

| | | |
|---|---|---|
| CN | 101501450 A | 8/2009 |
| CN | 102822880 A | 12/2012 |

(Continued)

*Primary Examiner* — Truc M Do
(74) *Attorney, Agent, or Firm* — Birch, Stewart, Kolasch & Birch, LLP

(57) ABSTRACT

A vehicle terminal installed in a vehicle and communicating with an external server, and a location-based content sharing system including the same are provided. The vehicle terminal includes a GPS receiving unit configured to receive location information regarding a location at which the vehicle is positioned, a wireless communication unit configured to receive information regarding a predetermined region and content corresponding to the predetermined region from the external server, a controller configured to determine whether the vehicle enters the predetermined region by using the location information, and reproduce the content corresponding to the predetermined region when the vehicle enters the predetermined region, and an output unit configured to output the reproduced content.

16 Claims, 5 Drawing Sheets

(56) References Cited

U.S. PATENT DOCUMENTS

| | | | |
|---|---|---|---|
| 8,682,342 B2* | 3/2014 | Lin | H04W 4/02 455/456.1 |
| 8,755,824 B1* | 6/2014 | Wang | H04W 4/021 340/539.13 |
| 2008/0070593 A1* | 3/2008 | Altman et al. | 455/457 |
| 2008/0132251 A1* | 6/2008 | Altman et al. | 455/457 |
| 2008/0132252 A1* | 6/2008 | Altman | G06Q 30/0207 455/457 |
| 2008/0234929 A1* | 9/2008 | Watson et al. | 701/207 |
| 2009/0005077 A1 | 1/2009 | Forstall et al. | |
| 2010/0076968 A1* | 3/2010 | Boyns et al. | 707/732 |
| 2010/0145947 A1* | 6/2010 | Kolman et al. | 707/736 |
| 2010/0223001 A1 | 9/2010 | Sugawara et al. | |
| 2010/0306138 A1* | 12/2010 | Hotes et al. | 706/12 |
| 2011/0083101 A1* | 4/2011 | Sharon et al. | 715/800 |
| 2011/0119133 A1* | 5/2011 | Igelman et al. | 705/14.58 |
| 2011/0270923 A1* | 11/2011 | Jones | G06F 3/0421 709/204 |
| 2011/0291860 A1 | 12/2011 | Ozaki et al. | |
| 2012/0047011 A1* | 2/2012 | Rippetoe et al. | 705/14.45 |
| 2012/0047208 A1* | 2/2012 | Kwon et al. | 709/204 |
| 2012/0064919 A1* | 3/2012 | Purdy | 455/456.3 |
| 2012/0135756 A1* | 5/2012 | Rosso et al. | 455/456.3 |
| 2012/0220308 A1* | 8/2012 | Ledlie | 455/456.1 |
| 2012/0277957 A1 | 11/2012 | Inoue et al. | |
| 2013/0091452 A1* | 4/2013 | Sorden | G06F 3/048 715/771 |
| 2013/0143535 A1* | 6/2013 | Leppanen | H04W 4/08 455/414.1 |
| 2013/0165152 A1* | 6/2013 | Nichols | H04L 67/306 455/456.3 |
| 2013/0218974 A1* | 8/2013 | Cao et al. | 709/204 |
| 2013/0226371 A1* | 8/2013 | Rovik | H04L 63/102 701/2 |
| 2013/0226449 A1* | 8/2013 | Rovik | G01C 21/362 701/424 |
| 2013/0267253 A1* | 10/2013 | Case et al. | 455/456.3 |
| 2013/0337830 A1* | 12/2013 | Haro | H04W 4/02 455/456.1 |
| 2014/0162692 A1* | 6/2014 | Li | H04L 67/40 455/456.3 |

FOREIGN PATENT DOCUMENTS

| | | |
|---|---|---|
| EP | 1 024 347 A1 | 8/2000 |
| EP | 2 053 356 A1 | 4/2009 |
| WO | WO 2012/089283 A1 | 7/2012 |

* cited by examiner (a)

(b)

VEHICLE TERMINAL AND LOCATION-BASED CONTENT SHARING SYSTEM HAVING THE SAME

CROSS REFERENCE TO RELATED APPLICATIONS

Pursuant to 35 U.S.C. §119(a), this application claims the benefit of earlier filing date and right of priority to Korean Application No. 10-2013-0003040, filed on Jan. 10, 2013, the contents of which is incorporated by reference herein in its entirety.

BACKGROUND OF THE INVENTION

Field of the Invention

The present disclosure relates to a vehicle terminal installed in a vehicle and performing communication with an external server and a location-based content sharing system including the same.

Description of the Related Art

A vehicle terminal may refer to a terminal installed in a vehicle. Vehicle terminals may include terminals used in a car navigation system, a vehicle television (TV), a telematics system, and the like. Vehicle terminals generally include a display device to provide required visual information to users.

As functions become more diversified, vehicle terminals can support more complicated functions such as capturing images or video, playing games, receiving broadcast signals, and the like, in addition to a navigation function or a function of reproducing music or video files. By comprehensively and collectively implementing such functions, vehicle terminals may be embodied in the form of a multimedia player or device. Also, in order to support and increase the functionality of vehicle terminals, software and hardware improvements, as well as changes and improvements in the structural components which form vehicle terminals may be considered.

On the strength of such improvements, a location-based service may be added to vehicle terminals. A location-based service refers to a service that transmits a user location to an external server and share relevant information by combining a global positioning system (GPS) installed in a vehicle terminal and a social networking service (SNS). The location-based service may include a service that provides a location and information between users (i.e., acquaintances) through vehicle terminals, a service that allows a user to search only information within a few kilometer radius on the basis of a user location, and a service that may search a store, a restaurant, and the like, around the user and evaluate it, and the like.

SUMMARY OF THE INVENTION

An aspect of the present disclosure provides a vehicle terminal capable of sharing content by using a location-based service, and a location-based content sharing system including the same.

To achieve these and other advantages and in accordance with the purpose of the present disclosure, as embodied and broadly described herein, the present disclosure provides in one aspect a vehicle terminal installed in a vehicle and communicating with an external server, including: a GPS receiving unit configured to receive location information regarding a location at which the vehicle is positioned; a wireless communication unit configured to receive information regarding a predetermined region and content corresponding to the predetermined region from the external server; a controller configured to determine whether the vehicle enters the predetermined region by using the location information, and reproduce the content corresponding to the predetermined region when the vehicle enters the predetermined region; and an output unit configured to output the reproduced content.

In an exemplary embodiment of the present disclosure, the output unit may include a display unit that outputs a map, and the controller may map at least one of a location in which the vehicle is positioned and the predetermined region to the map, and output the same.

In an exemplary embodiment of the present disclosure, the vehicle terminal may further include: a user input unit configured to sense a user input applied to the predetermined region mapped to the map, wherein when the user input is sensed, the controller may output information regarding the content corresponding to the predetermined region to the display unit. In this case, the information regarding the content may include at least one of a title of the content, a comment regarding the content, information regarding a user who uploaded the content, and a date on which the content was uploaded.

In an exemplary embodiment of the present disclosure, when the predetermined region is mapped to the map, the controller may output a thumbnail image with respect to the content to a partial region of the map.

In an exemplary embodiment of the present disclosure, the vehicle terminal may further include: a user input unit configured to receive a command with respect to the reproduced content, wherein the controller may transmit the input command to the external server such that the input command may be shared.

In an exemplary embodiment of the present disclosure, the content may be at least one of a video, music, and a photograph.

To achieve these and other advantages and in accordance with the purpose of the present disclosure, as embodied and broadly described herein, the present disclosure provides in another aspect a location-based content sharing system including: an external server configured to store at least one predetermined region and content corresponding to the predetermined region as a location-based content log; and a vehicle terminal installed in a vehicle and configured to receive information regarding the predetermined region, and receive and reproduce content corresponding to the predetermined region when the vehicle enters the predetermined region.

In an exemplary embodiment of the present disclosure, the vehicle terminal may transmit location information regarding a location in which the vehicle is located and content desired to be shared in the location in which the vehicle is located, to the external server, and the external server may set a new region by using the location information and add the new region and the content desired to be share to the location-based content log.

In an exemplary embodiment of the present disclosure, the external server may divide a plurality of vehicle terminals into groups, and separately manage the location-based content log for each group. Also, the vehicle terminal may add, delete, or edit a group member of the group to which the vehicle terminal belongs, among the groups.

In an exemplary embodiment of the present disclosure, the external server may share the location-based content log with at least one social networking service (SNS) set by a user.

According to an exemplary embodiment of the present disclosure, when a vehicle enters a predetermined region, content corresponding to the predetermined region may be reproduced by a vehicle terminal, whereby the content corresponding to the predetermined region may be shared together with the predetermined region.

According to an exemplary embodiment of the present disclosure, since a location-based content sharing system interworks with a navigation system of a vehicle, share content and a predetermined region in which the content is reproduced may be checked on a map.

Further scope of applicability of the present disclosure will become apparent from the detailed description given hereinafter. However, it should be understood that the detailed description and specific examples, while indicating preferred exemplary embodiments of the invention, are given by illustration only, since various changes and modifications within the spirit and scope of the invention will become apparent to those skilled in the art from this detailed description.

BRIEF DESCRIPTION OF THE DRAWINGS

The present disclosure will become more fully understood from the detailed description given hereinbelow and the accompanying drawings, which are given by illustration only, and thus are not limitative of the present disclosure, and wherein.

DETAILED DESCRIPTION OF THE INVENTION

Hereinafter, the present disclosure will be described more fully with reference to the accompanying drawings, in which exemplary embodiments of the present disclosure are shown. As those skilled in the art would realize, the described exemplary embodiments may be modified in various different ways, all without departing from the spirit or scope of the present disclosure. To clarify the present disclosure, portions irrespective of description are limited and like numbers refer to like elements throughout the specification.

Vehicle terminals described in the present disclosure may refer to a terminal installed in a vehicle. For example, vehicle terminals may include mobile phones, smart phones, notebook computers, digital broadcast receivers, personal digital assistants (PDAs), portable multimedia players (PMPs), navigation devices, and the like, that may be detachably attached to a holder or a rest, as well as fixed types of terminal installed in vehicles.

Figure 1:
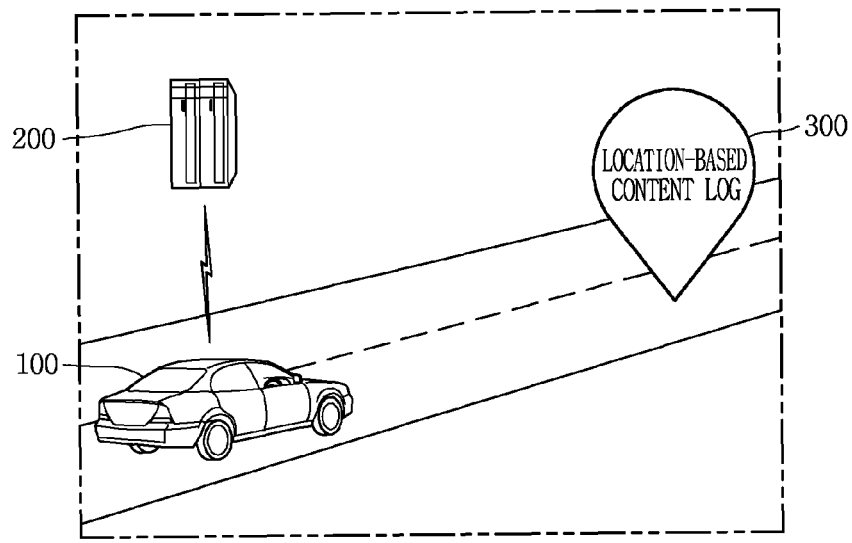
FIG. 1 is a conceptual view illustrating a location-based content sharing system including a vehicle terminal according to an exemplary embodiment of the present disclosure.

FIG. 1 is a conceptual view illustrating a location-based content sharing system including a vehicle terminal according to an exemplary embodiment of the present disclosure.

Referring to FIG. 1, the location-based content sharing system may include an external server 200, a vehicle terminal 100, and a location-based content log 300.

The external server 200 may refer to a server that stores and manages location-based content. The external server 200 may provide a service according to a request from the vehicle terminal 100 and may distirbutedly process one or more application programs in a mutually cooperative environment. For example, in a wireless Internet environment, information stored in the external server 100 may be used by at least one vehicle terminal 100.

In particular, the external server 200 may set a predetermined region by using an address and at least one of a latitude, a longitude, and an altitude, and store content corresponding to the predetermined region in a memory. For example, the external server 200 may set "Kwangandaegyo (Bridge), Minnak-dong, Sooyoung-gu, Busan" as a first region, and store "Movie Haewoondae" as content corresponding to the first region. In another example, the external server 200 may set a region with a 1-kilometer radius on the basis of "Longitude: 129 degrees and 8 minutes 45.5, Latitude: 35 degrees 10 minutes 46.76" as a second region and store "Kwangandaegyo Bridge photograph taken in Sungbulsa" as content corresponding to the second region.

A plurality of predetermined regions may be set, and one or more content items corresponding to respective predetermined regions may be stored. The predetermined regions may be set in various manners. For example, when a location is specified by using a latitude and a longitude, a region within a 1-kilometer radius may be set as a predetermined region. In another example, an administrative district (or a jurisdiction) such as a particular city, town (eup), township (myeon), village (ri), and the like, may be set as a predetermined region by using address information such as "Jinyoung-eup, Kimhae-city, Kyungsangnam-do". In another example, Route 1 belonging to Kyungki-do may be set as a predetermined region by using road information such as "Kyungki-do Route 1". A predetermined region may be implemented in various forms and the present disclosure is not limited to the embodiment described herein.

In this case, content may refer to digital information or contents thereof provided through a wired/wireless communication network of the external server 200. For example, a video, music, a photograph, a game, a broadcast, a book, and the like, may be content. Content may be output through a speaker, a display unit, and the like, of the vehicle terminal 100.

In the present disclosure, a predetermined region and at least one content corresponding to the predetermined region may be named as a location-based content log 300. The location-based content log 300 may be added to the external server 200 in various manners. For example, a server manager may add the location-based content log 300 or the vehicle terminal 100 registered to the external server 200 may add the location-based content log 300. Also, the location-based content log 300 stored in the external server 200 may be deleted or edited by the vehicle terminal 100 which has created the log.

The external server 200 may transmit the at least one location-based content log 300 stored in the memory to the at least one vehicle terminal 100 stored in a database. The eternal server 200 may transmit at least one of a predetermined region corresponding to the location-based content log 300 and content corresponding to the predetermined region to the vehicle terminal 100.

The vehicle terminal 100 is installed in a vehicle and communicates with the eternal server 200. In particular, the vehicle terminal 100 may receive the location-based content log 300 transmitted from the external server 200. The received location-based content log 300 may be stored in the memory of the vehicle terminal 100.

Also, the vehicle terminal 100 may include a global positioning system (GPS) calculating location information of a vehicle in which the vehicle terminal 100 is installed. The vehicle terminal 100 may determine whether the vehicle enters a predetermined region by using the calculated location information. When the vehicle is determined to enter the predetermined region according to the determination result, the vehicle terminal 100 may receive content corresponding to the predetermined region and reproduce the same.

For example, as the location-based content log 300, "Kwangandaegyo (Bridge), Minnak-dong, Sooyoung-gu, Busan" may be set as a first region and "Movie Haewoondae" may be stored as content corresponding to the first region. In this case, when the vehicle in which the vehicle terminal 100 is installed enters "Kwangandaegyo", the vehicle terminal 100 may reproduce "Movie Haewoondae" as the vehicle terminal 100 enters the first region. Thus, a video of "Movie Haewoondae" may be output to a display unit and an audio (i.e., a sound) may be output by an audio output module.

In another example, as the location-based content log 300, "Area in which incidence rate of sleepy driver accidents is the highest" is set as a second region and "Siren music for shaking off sleepness" may be stored as a content corresponding to the second region. In this case, when the vehicle enters the second region, the vehicle terminal 100 may reproduce the "Siren music for shaking off sleepness".

As described above, according to the present disclosure, in the location-based content sharing system, when the vehicle enters a predetermined region, content corresponding to the predetermined region may be reproduced. Thus, location-based content may be shared between users (i.e., acquaintances or friends). Namely, when a vehicle runs in a particular location, content, which was registered by an acquaintance while passing by the location, may be shared. In this case, in that the user shares content related to the particular location at the particular location, even sensitivity of an acquaintance, as well as content, may be shared.

Figure 2:
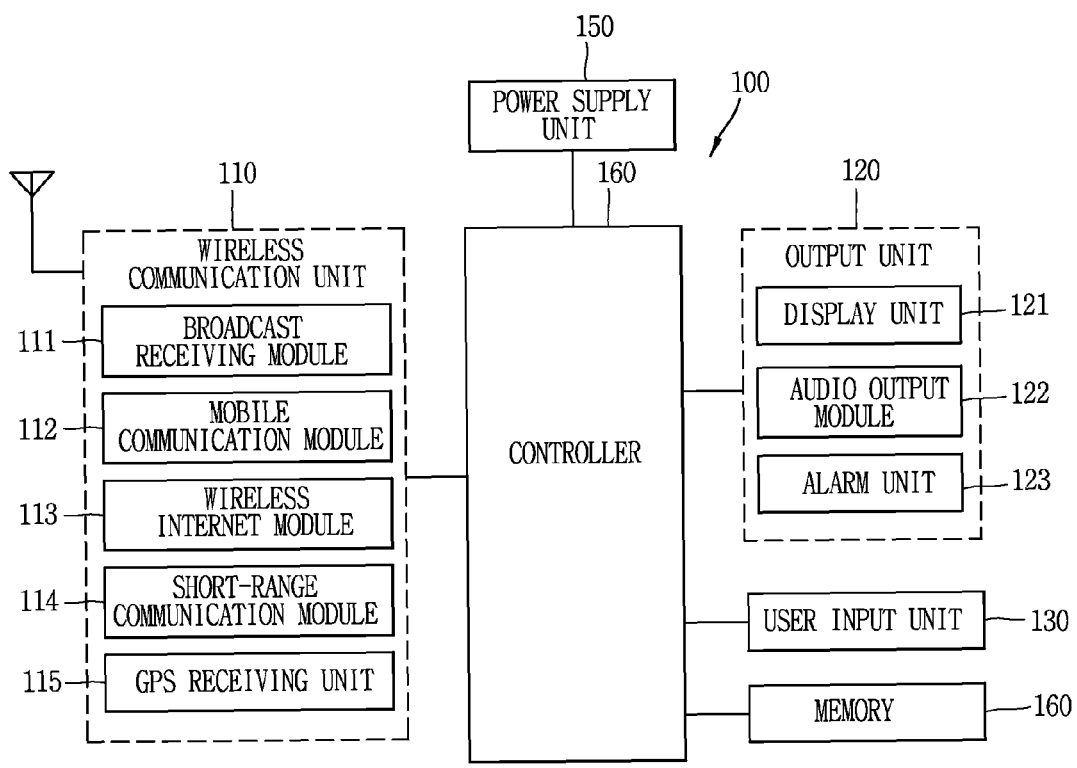
FIG. 2 is a block diagram illustrating a vehicle terminal according to an exemplary embodiment of the present disclosure.

FIG. 2 is a block diagram of the vehicle terminal according to an exemplary embodiment of the present disclosure.

Referring to FIG. 2, the vehicle terminal 100 may include a wireless communication unit 110, an output unit 120, a user input unit 130, a memory 140, a power supply unit 150, and a controller 160. FIG. 2 shows the vehicle terminal as having various components, but it should be understood that implementing all of the illustrated components is not a requirement. Greater or fewer components may alternatively be implemented.

Hereinafter, the elements 110 to 160 of the vehicle terminal 100 will be described in detail as follows.

The wireless communication unit 110 typically includes one or more modules allowing radio communication between the vehicle terminal 100 and a wireless communication system or a network in which the vehicle terminal is located. For example, the wireless communication unit may include at least one of a broadcast receiving module 111, a mobile communication module 112, a wireless Internet module 113, a short-range communication module 114, and a GPS receiving unit 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. The broadcast signal and broadcast associated information received by the broadcast receiving module 111 may be stored in the memory 140.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception. Also, the mobile communication module 112 may receive information regarding a predetermined region and content corresponding to the predetermined region from an external server.

The wireless Internet module 113 supports wireless Internet access for the vehicle terminal. This module may be internally or externally coupled to the vehicle terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The GPS receiving unit 115 is a module for obtaining allocation of the vehicle terminal 100. A typical example of the GPS receiving unit 115 may be a global positioning system (GPS). The GPS receiving unit 115 may calculate location information of a vehicle in which the vehicle terminal 100 is installed.

The output unit 120 is configured to provide outputs in a visual, audible, and/or tactile manner (e.g., audio signal, video signal, alarm signal, vibration signal, etc.). The output unit 120 may include the display unit 121, an audio output module 122, and an alarm unit 123.

The display unit 121 may display (output) information processed in the vehicle terminal 100. For example, when the vehicle terminal 100 is in a navigation mode, the display unit 121 may display a user interface (UI) or a graphic user interface (GUI) associated with navigation. When the vehicle terminal 100 is in broadcast reception mode, the display unit 121 may display a received image, a UI or GUI, and the like.

The display unit 121 may include at least one of a liquid crystal display (LCD), a thin film transistor-LCD (TFT-LCD), an organic light emitting diode (OLED) display, a flexible display, a three-dimensional (3D) display, and an e-ink display.

The display unit 121 may be configured as one or more display units, and in this case, the one or more display units may be configured to be transparent or light-transmissive to allow for viewing of the exterior, which may be called transparent displays. A typical transparent display may be, for example, a TOLED (Transparent Organic Light Emitting Diode) display, or the like. The display unit 121 may be configured as a light-transmissive display in front glass of a vehicle. Through such configuration, a user can view an object positioned at a front side of the vehicle through a region occupied by the display unit 121 in the vehicle.

The vehicle terminal 100 may include two or more display units according to its particular desired embodiment. For example, a plurality of display units may be separately or integrally disposed on one surface of the vehicle terminal, or may be separately disposed on mutually different surfaces.

The display unit 121 may output a map according to a navigation mode. The display unit 121 may map location information of a vehicle calculated by the GPS receiving unit 115. Besides, when a partial region of the map output to the display unit 121 overlaps with a predetermined region, the display unit 121 may map the predetermined region to the map by using a graphic object, or the like.

Here, mapping refers to outputting a graphic image or an object to a pre-set position of a two-dimensional (2D) image or a three-dimensional (3D) image in an overlapping manner. For example, outputting of a new pop-up window to a map may be considered as mapping of the pop-up window to the map. Here, an object refers to a graphic element such as an application icon, a widget, a thumbnail image, or the like.

The touch sensor may have a form of a touch film, a touch sheet, a touch pad, and the like. The touch sensor may be configured to convert pressure applied to a particular portion of the display unit 121 or a change in the capacitance or the like generated at a particular portion of the display unit 121 into an electrical input signal. The touch sensor may be configured to detect the pressure when a touch is applied, as well as the touched position and area.

When a touch sensor and the display unit 121 are overlaid in a layered manner, the display unit 121 may function as both an input device and an output device. Such a display unit 121 may be called a 'touch screen'.

When there is a touch input through the touch screen, a corresponding signal (signals) is transmitted to a touch controller (not shown). The touch controller processes the signals and transmits corresponding data to the controller 160. Accordingly, the controller 160 may recognize which portion of the display unit 121 has been touched.

In case where the touch screen is the capacitance type, proximity of a sensing object may be detected by a change in electric field according to the proximity of the sensing object. In this case, the touch screen may be classified as a proximity sensor.

The audio output module 122 may convert and output as sound audio data received from the wireless communication unit 110 or stored in the memory 140 in a call signal reception mode, a call mode, a record mode, a voice selection mode, a broadcast reception mode, and the like. Also, the audio output module 122 may provide audible outputs related to a particular function performed by the vehicle terminal 100 (e.g., a call signal reception sound, a message reception sound, navigation alarm, etc.). The audio output module 122 may include a receiver, a speaker, a buzzer, or the like.

The alarm unit 123 outputs a signal for informing about an occurrence of an event of the vehicle terminal 100. Events generated in the vehicle terminal may include call signal reception, message reception, key signal inputs, a touch input etc. In addition to video or audio signals, the alarm unit 123 may output a signal to inform about an occurrence of an event, through vibrations. The video or audio signals may also be output via the display unit 121 or the audio output module 122, so the display unit 121 and the audio output module 153 may be classified as parts of the alarm unit 123.

The user input unit 130 may generate input data from commands entered by a user to control various operations of the vehicle terminal. The user input unit 130 may include a keypad, a dome switch, a touch pad (resistive and capacitive), a jog wheel, a jog switch, and the like. Also, the user input unit 130 may sense a touch input applied to at least one predetermined region output to the display unit 121.

The memory 140 may store software programs used for the processing and controlling operations performed by the controller 180, or may temporarily store data (e.g., a phonebook, messages, still images, video, etc.) that are inputted or outputted. In addition, the memory 140 may store data regarding various patterns of vibrations and audio signals outputted when a touch is inputted to the touch screen.

The memory 140 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the vehicle terminal 100 may be operated in relation to a web storage device that performs the storage function of the memory 140 over the Internet.

The power supply unit 190 receives external power or internal power and supplies appropriate power required for operating respective elements and components under the control of the controller 180.

The controller 160 may control a general operation of the vehicle terminal 100. For example, the controller 160 may perform controlling and processing related to receiving a predetermined region, calculating location information, determining whether a vehicle enters a predetermined region, and the like. In particular, the controller 160 may store one or more predetermined regions received from the external server 200 in the memory 140. The controller 160 may determine whether a vehicle enters at least one predetermined region by using location information calculated by using the GPS receiving unit. When the vehicle enters the predetermined region, the controller 160 may reproduce content corresponding to the predetermined region.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 140 and executed by the controller 180.

Figure 3:
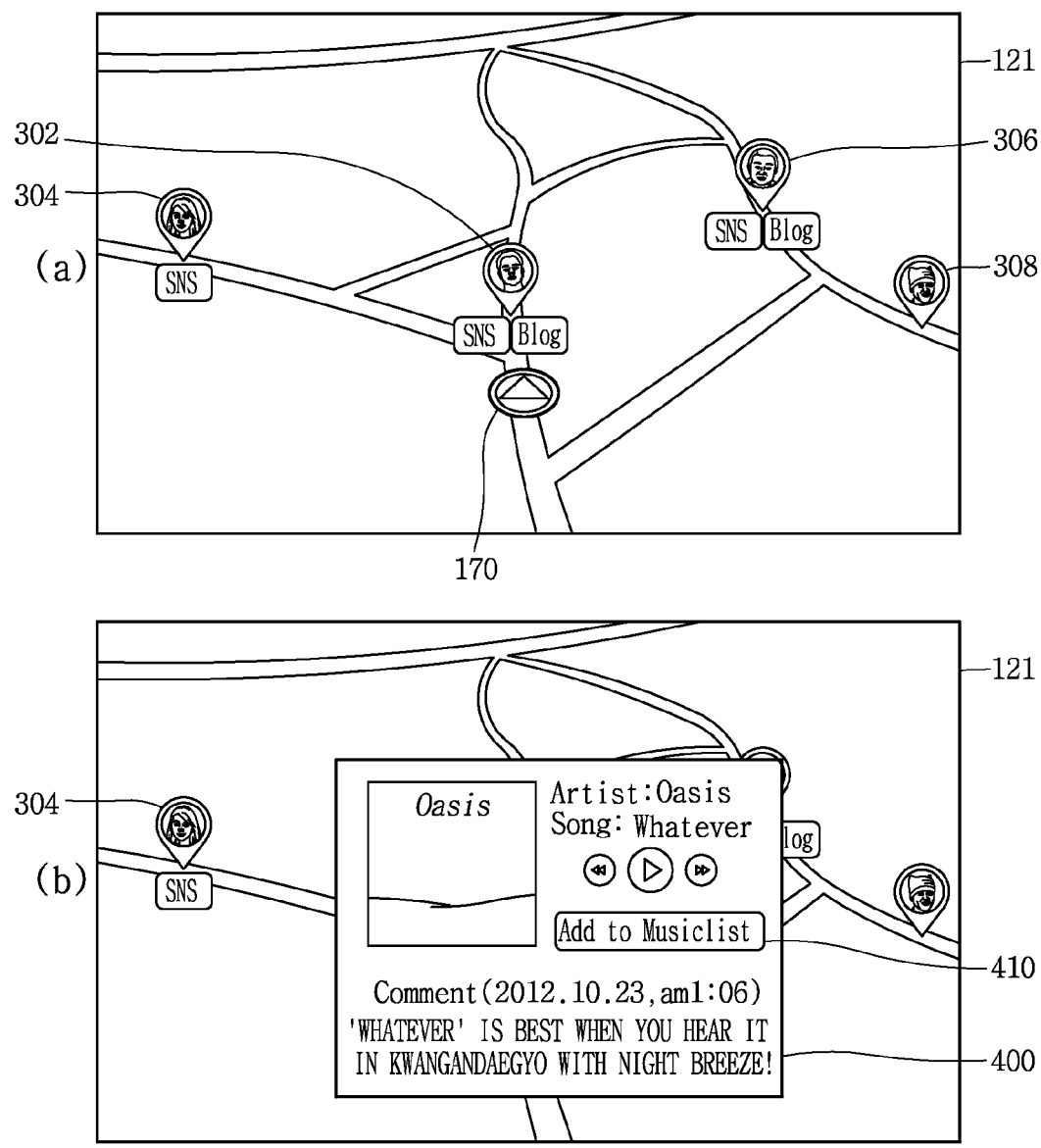
FIG. 3 is a view illustrating a vehicle terminal that reproduces (or plays) content when the vehicle terminal enters a predetermined region according to an exemplary embodiment of the present disclosure.

FIG. 3 is a view illustrating a vehicle terminal that reproduces content when entering a predetermined region according to an exemplary embodiment of the present disclosure.

Referring to FIG. 3, the vehicle terminal 100 may include the display unit 121 that outputs a map. At least one of a location of the vehicle and a predetermined region may be mapped to a map and output to the display unit 121. Referring to (a) of FIG. 3, it can be seen that a location 170 of the vehicle and predetermined regions 302 to 308 are mapped in the map.

The map is information stored in the memory 140 and may be output as having a scale appropriate to a physical size of the display unit 121. The scale may be changed by a user input, and thus, an amount of information of the map output to the display unit 121 may vary.

The controller 160 may calculate location information of the vehicle by using the GPS receiving unit 115. The controller 160 may map the location 170 of the vehicle to the map by using the calculated location information and output the same. The location 170 of the vehicle may be mapped to the map by various graphic objects. Accordingly, the user of the vehicle terminal 100 may ascertain the location of the vehicle in the map.

The controller 160 may map at least one certain region received from the external server 200 to the map and output the same. Referring to (a) of FIG. 3, it can be seen that predetermined regions 302 to 308 are mapped to the map by icons having a text balloon. The predetermined regions may also be mapped to the map by various graphic objects, like the location 170 of the vehicle. For example, in a case in which "Kyungki-do Route 1" is set as a predetermined region, the corresponding region may be output to have a color differentiated from other regions.

As well as displaying the predetermined region such that it is differentiated from other regions, information including a location-based content log may be displayed together. Namely, various types of including a location-based content log may be mapped to the map in a predetermined region.

For example, the location-based content log may further include information regarding a person who has created a log, information such as a Web site interworking with the external server 200, and the like, as well as information related to content corresponding to a predetermined region. A Web site may be a social networking service (SNS) or a blog.

While the map is being output, the vehicle with the vehicle terminal 100 installed therein may enter the predetermined region 304. Here, the controller 160 may determine whether the vehicle enters the predetermined region by using a location-based content log received from the external server 200 and location information of the vehicle calculated by the GPS receiving unit 115.

When the vehicle enters the predetermined region 304, the controller 160 may receive content corresponding to the predetermined region 304 from the external server 200 and reproduce the same. Referring to (a) of FIG. 3, it can be seen that the vehicle enters the predetermined region 304. Also, referring to (b) of FIG. 3, it can be seen that music 400 "Whatever" is reproduced (or played) as content corresponding to the predetermined region 304.

In reproducing the content, the controller 160 may output the content by using at least one configuration 121 to 123 constituting the output unit 150. In this case, the controller 160 may output at least one of a title of the reproduced content, a comment with respect to the reproduced content, information regarding a user who has uploaded the reproduced content, and a date on which the reproduced content was uploaded, to the display unit 121.

Also, the controller 160 may output an icon 410 formed to add the reproduced content to a content box (e.g., a music list) to the display unit 121. For example, when a user input applied to the icon 410 is sensed, the controller 160 may execute a content purchase mode in which the reproduced content may be purchased, or may download a data file of the reproduced content and store the same in the memory 140. This is because content may correspond to a creative work.

Figure 4:
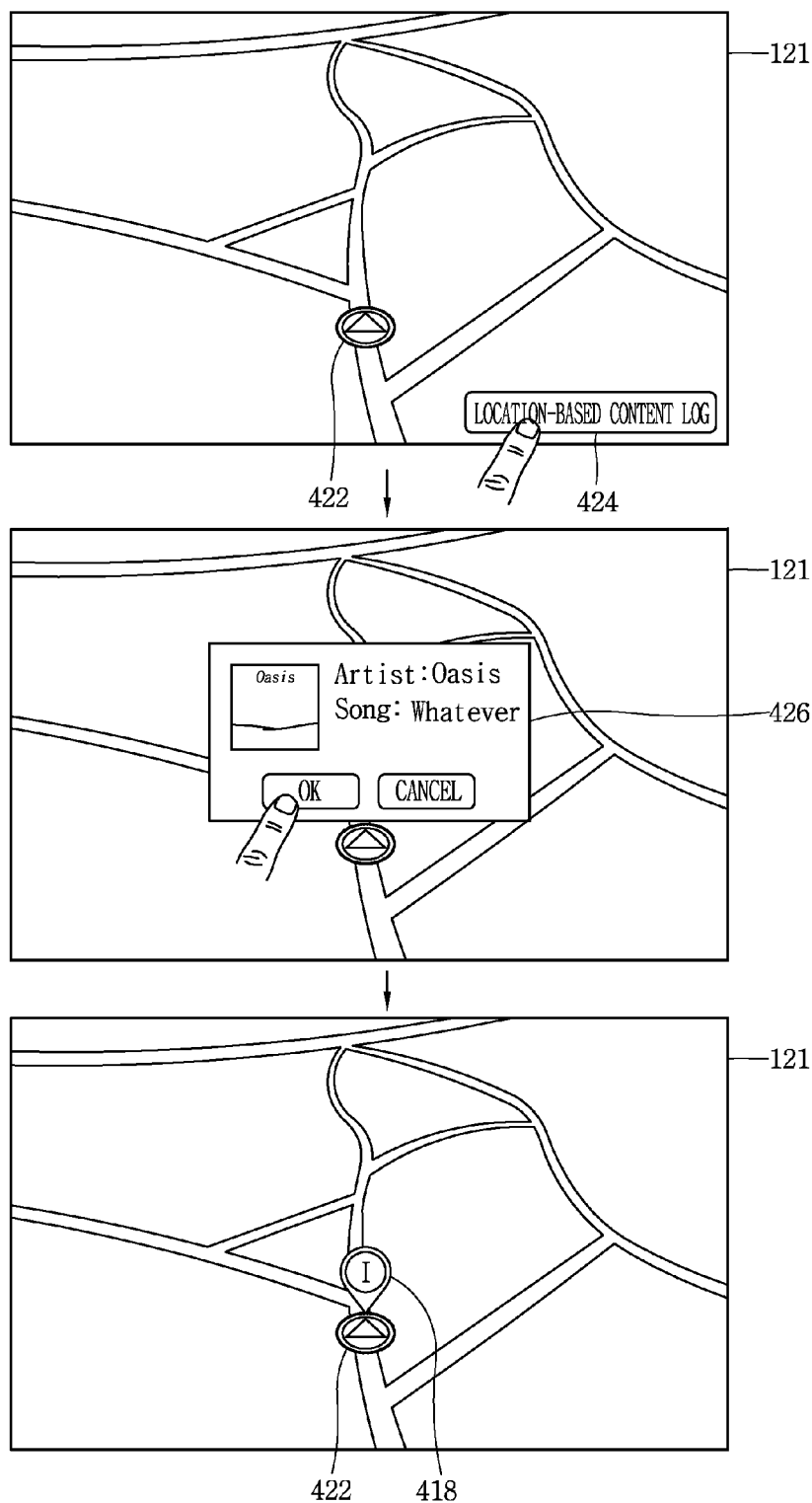
FIG. 4 is a view illustrating a vehicle terminal that adds location-based content log according to an exemplary embodiment of the present disclosure.

FIG. 4 is an exemplary view illustrating the vehicle terminal of adding a location-based content log according to an exemplary embodiment of the present disclosure.

Referring to FIG. 4, the vehicle terminal 100 according to the present exemplary embodiment of the present disclosure may include a display unit 121. Also, location information of a vehicle calculated by the GPS receiving unit 115 may be mapped to a map.

In this case, an icon 424 for adding a location-based content log may be output to the display unit 121. For example, when the display unit 121 operates as a touch screen, a mode for adding the location-based content log may be executed on the basis of a user's touch input. In another example, the icon 424 for adding a location-based content log may be selected by a separately provided user input unit.

For example, in a case in which the user of the vehicle terminal 100 wants to share a song "Busan seagull" that he or she has heard while passing by "Kwangandaegyo (Bridge)" with acquaintances, the user may execute the mode for adding the location-based content log.

When the mode for adding the location-based content log is executed, for example, information 426 regarding content, which is being reproduced and output (e.g., audio) in the vehicle terminal 100, may be output to the display unit 121. In another example, some of content items stored in the memory 140 of the vehicle terminal 100 may be output to the display unit 121 and the user may select content desired to be shared. In another example, at least one content desired to be shared may be received from terminals that perform short-range communication with the vehicle terminal 100, and information 426 regarding the received content may be output. In another example, a search word of content desired to be shared may be received, content may be searched in a Web site by using the search word, and information 426 regarding at least one searched content may be output.

Next, when at least one content desired to be shared is selected according to a user input, the controller 160 may transmit information 422 regarding a location in which the vehicle is positioned and content desired to be shared in the location in which the vehicle is positioned to the external server 200. When the external server 200 receives the information from the vehicle terminal 100, the external server 200 may set a new region by using the location information 422 and add the new region and the content desired to be shared to a location-based content log 418. Accordingly, the new location-based content log 418 may be registered to the external server 200.

Here, information regarding a creator (i.e., a writer or a generator) of the location-based content log may be mapped as a graphic object to the map and output. For example, an image of the creator, a name of the creator, a nickname of the creator, a vehicle number of the vehicle in which the vehicle terminal 100 is installed, a contact number of the creator, and the like, may be output as information of the creator.

Although not shown, the vehicle terminal 100 may set a sharing target of the newly registered location-based content log. For example, all the vehicle terminals included in a pre-set group may share the newly registered location-based content log. In another example, at least some of the vehicle terminals included in the pre-set group may be selected, and the selected vehicle terminals may share the newly registered location-based content log. In this case, the pre-set group may be managed by the external server 200.

Also, the newly registered location-based content log may be shared with at least one social networking service (SNS). When the new location-based content log is added by the vehicle terminal 100, the external server 200 may upload information a predetermined region and information regarding content corresponding to the predetermined region to a pre-set SNS.

In this manner, by sharing content reproduced at a particular location, what a user felt at the particular location may also be shared. Also, since the location-based content log is uploaded by interworking with the SNS, information regarding the fact that the location-based content log has been newly added may be provided to acquaintances.

Figure 5:
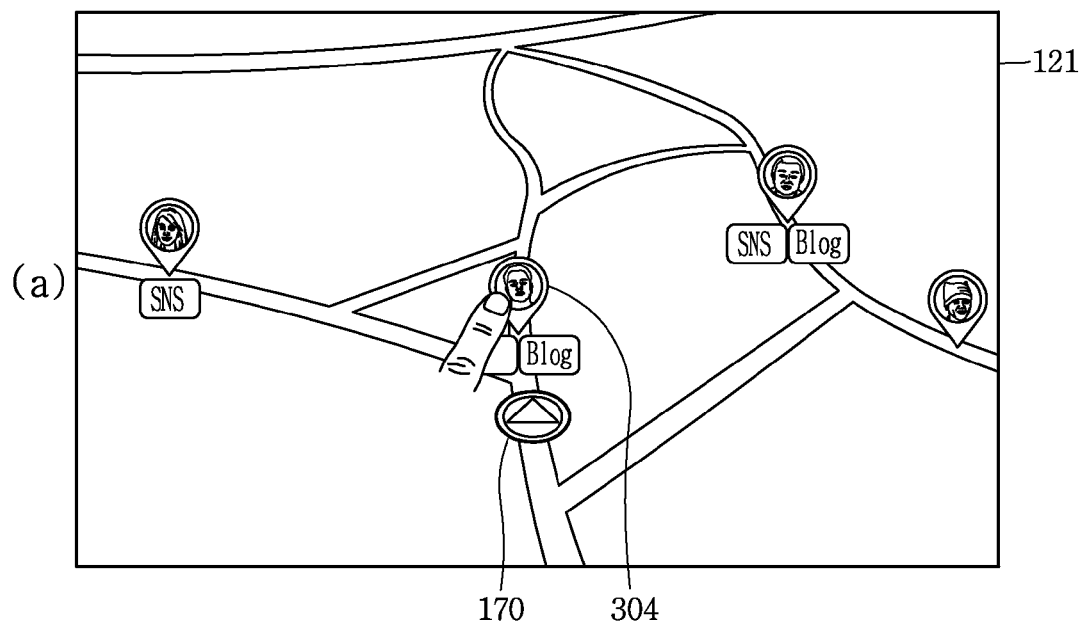
FIG. 5 is a view illustrating a vehicle terminal that outputs information regarding content corresponding to a predetermined area according to an exemplary embodiment of the present disclosure.
Figure 5:
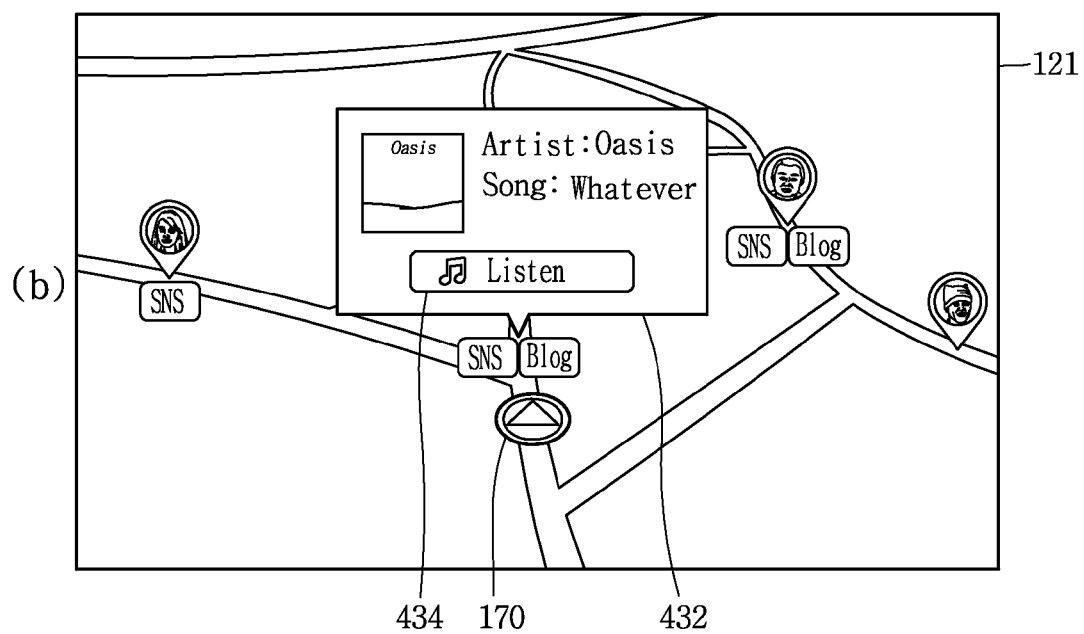

FIG. 5 is a view illustrating the vehicle terminal that outputs information regarding content corresponding to a predetermined region according to an exemplary embodiment of the present disclosure.

Referring to FIG. 5, the vehicle terminal 100 according to an exemplary embodiment of the present disclosure may include the display unit 121. At least one of a location of a vehicle and a predetermined region may be mapped to a map and output to the display unit 121. Referring to (a) of FIG. 5, it can be seen that a location 170 of a vehicle and predetermined regions are mapped.

In this case, regardless of whether the vehicle enters a predetermined region, the vehicle terminal 100 may include the user input unit 130 for sensing a user input applied to the predetermined region output to the display unit 121.

Referring to (b) of FIG. 5, when a user input applied to a predetermined region is sensed by the user input unit 130, the controller 160 may output information 432 regarding content corresponding to the predetermined region to the display unit 121. In this case, the information 432 regarding the content may include at least one of a name of the content, a comment regarding the content, information regarding a user who has uploaded the content, and date on which the content was uploaded.

The comment regarding the content is a description regarding the content expressed by the creator of the location-based content log, which includes a description of contents of the content, a feeling desired to be shared together with the content, a fact, and the like.

Even though the vehicle in which the vehicle terminal 100 is installed does not enter a predetermined region, the predetermined region may be selected, and content corresponding to the predetermined region may be reproduced by using a reproduction icon 434 regarding the content corresponding to the predetermined region. Accordingly, the user of the vehicle terminal 100 may check at least one shared location-based content log and reproduce (or play) the corresponding content.

Figure 6:
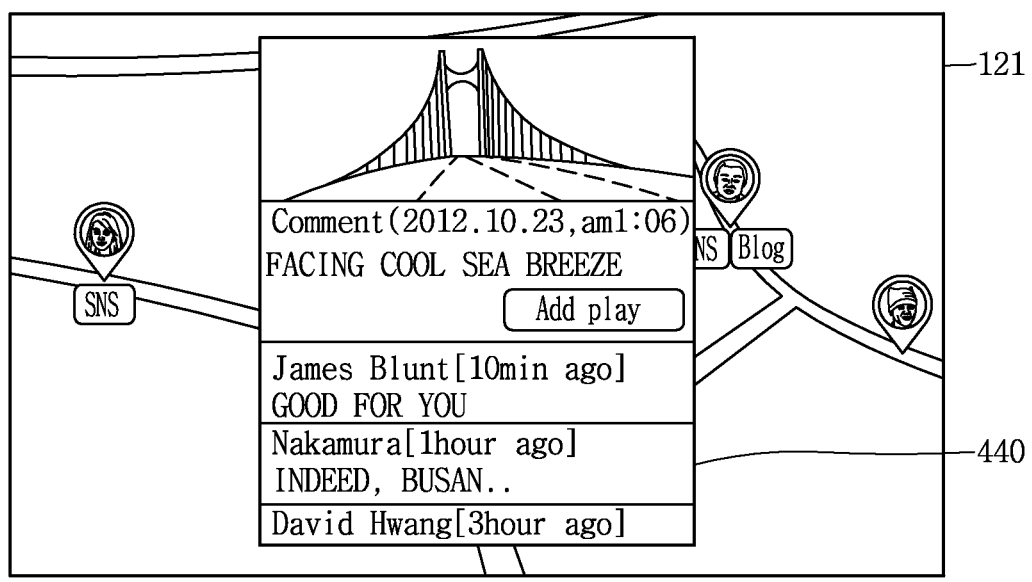
FIG. 6 is a view illustrating a vehicle terminal that shares a comment with respect to location-based content according to an exemplary embodiment of the present disclosure.

FIG. 6 is a view illustrating a vehicle terminal that shares a comment with respect to location-based content according to an exemplary embodiment of the present disclosure.

Referring to FIG. 6, as the vehicle with the vehicle terminal installed therein enters a predetermined region, content corresponding to the predetermined region may be reproduced. In this case, thumbnail images with respect to the content may be output to a partial region of a map.

Also, information regarding the content may include at least one comment with respect to the content. The comment, which is created by vehicle terminals that share the location-based content log, may be a short comment in response to the location-based content log.

In order to create such a comment, the user input unit 130 of the vehicle terminal 100 may be formed to receive a command with respect to content. The controller 160 may transmit the comment input by the user input unit 130 to the external server 200 by using the wireless communication unit 110. The external server 200 may store the received comment and manage such that the vehicle terminals that share the location-based content log check the comment.

Although not shown, the external server 200 may divide a plurality of vehicle terminals into groups and separately manage the location-based content log for each group. For example, it may be assumed that, among vehicle terminals "A", "B", "C", "D", and "E" registered to the external server 200, "A", "B", and "C" may be classified as a first group and "D" and "E" may be classified as a second group. In this case, a location-based content log generated by the vehicle terminal "B" may be shared only by vehicle terminals belonging to the first group. Similarly, a location-based content log generated by the vehicle terminal "D" may be shared only by the vehicle terminals belonging to the second group.

Also, the vehicle terminal 100 may add a group member of the group to which the vehicle terminal 100 belongs, delete a group member from the group, or edit a group member, among the groups managed by the external server 200. For example, among the vehicle terminals "A", "B", "C", "D", and "E", the vehicle terminal "A' may add the vehicle terminal "D" to the first group. In this case, the vehicle terminal "D" may belong to both the first and second groups. In another example, the vehicle terminal "A" may register a new vehicle terminal "F", which has not been registered to the external server 200, to the external server 200 and add the vehicle terminal "F" to the first group.

As described above, according to exemplary embodiments of the present disclosure, when a vehicle in which a vehicle terminal is installed enters a predetermined region, content corresponding to the predetermined region may be reproduced by the vehicle terminal, whereby the content corresponding to the predetermined region may be shared together with the predetermined region by different vehicle terminals. Because even content related to a particular location is shared in the particular location, rather than simply sharing content, sensitivity of the users may also be shared.

As the exemplary embodiments may be implemented in several forms without departing from the characteristics thereof, it should also be understood that the above-described exemplary embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A vehicle terminal installed in a vehicle and communicating with an external server, the vehicle terminal comprising:

a GPS receiving unit configured to receive location information regarding a location at which the vehicle is positioned;
a wireless communication unit configured to receive information regarding a predetermined region and content corresponding to the predetermined region from the external server;
a controller configured to determine whether the vehicle enters the predetermined region by using the location information, and reproduce the content corresponding to the predetermined region when the vehicle enters the predetermined region, the content transmitted by another vehicle terminal installed in another vehicle to the external server with location information of said another vehicle while said another vehicle is located within the predetermined region, and the vehicle terminal registered to share the content with said another vehicle terminal while the vehicle is located within the predetermined region; and
an output unit configured to output the reproduced content, wherein the output unit comprises a display unit configured to display a map and information regarding the content on the map, and the controller further configured to control the display unit to indicate the location at which the vehicle is positioned and the predetermined region on the map, and wherein the predetermined region is set by the external server based on the location information of said another vehicle when the content is transmitted by said another vehicle terminal to the external server.

2. The vehicle terminal of claim 1, further comprising:
a user input unit configured to sense a user input applied to the predetermined region mapped to the map,
wherein when the user input is sensed, the controller outputs the information regarding the content corresponding to the predetermined region to the display unit.

3. The vehicle terminal of claim 2, wherein the information regarding the content comprises at least one of a title of the content, a comment regarding the content, information regarding a user who uploaded the content, or a date on which the content was uploaded.

4. The vehicle terminal of claim 1, wherein when the predetermined region is mapped to the map, the controller outputs a thumbnail image with respect to the content to a partial region of the map.

5. The vehicle terminal of claim 1, further comprising:
a user input unit configured to receive a command with respect to the reproduced content,
wherein the controller transmits the input command to the external server such that the input command is shared.

6. The vehicle terminal of claim 1, wherein the content is at least one of a video, music, or a photograph.

7. A location-based content sharing system comprising:
an external server configured to store content corresponding to a predetermined region as a location-based content log; and
a vehicle terminal installed in a vehicle and configured to receive information regarding the predetermined region, and receive and reproduce the content corresponding to the predetermined region when the vehicle enters the predetermined region, the content transmitted by another vehicle terminal installed in another vehicle to the external server with location information of said another vehicle while said another vehicle is located within the predetermined region, and the vehicle terminal registered to share the content with said another vehicle terminal while the vehicle is located within the predetermined region, wherein the vehicle terminal is configured to display a map and information regarding the content on the map, and to indicate the location at which the vehicle is positioned and the predetermined region on the map, and wherein the predetermined region is set by the external server based on the location information of said another vehicle when the content is transmitted by said another vehicle terminal to the external server.

8. The location-based content sharing system of claim 7, wherein the external server divides a plurality of vehicle terminals into groups, and separately manages a location-based content log for each group.

9. The location-based content sharing system of claim 8, wherein the vehicle terminal adds, deletes, or edits a group member of a group to which the vehicle terminal belongs.

10. The location-based content sharing system of claim 7, wherein the external server shares the location-based content log with at least one social networking service (SNS).

11. A method of a vehicle terminal installed in a vehicle and communicating with an external server, the method comprising:
receiving, via a GPS receiving unit, location information regarding a location at which the vehicle is positioned;
receiving, via a wireless communication unit, information regarding a predetermined region and content corresponding to the predetermined region from the external server;
determining, via a controller, whether the vehicle enters the predetermined region by using the location information;
reproducing, via the controller, the content corresponding to the predetermined region when the vehicle enters the predetermined region, the content generated and transmitted by another vehicle terminal installed in another vehicle to the external server with location information of said another vehicle while said another vehicle is located within the predetermined region, and the vehicle terminal registered to share the content with said another vehicle terminal while the vehicle is located within the predetermined region;
outputting, via an output unit, the reproduced content; and
displaying a map and information regarding the content on the map and indicating the location at which the vehicle is positioned and the predetermined region on the map, wherein the predetermined region is set by the external server based on the location information of said another vehicle when the content is transmitted by said another vehicle terminal to the external server.

12. The method of claim 11, further comprising:
sensing, via a user input unit, a user input applied to the predetermined region on the map; and
outputting, via the display unit, the information regarding the content corresponding to the predetermined region when the user input is sensed.

13. The method of claim 12, wherein the information regarding the content comprises at least one of a title of the content, a comment regarding the content, information regarding a user who uploaded the content, or a date on which the content was uploaded.

14. The method of claim 11, further comprising outputting a thumbnail image with respect to the content on a partial region of the map when the predetermined region is mapped to the map.

15. The method of claim 11, further comprising:
  receiving, via a user input unit, a command with respect to the reproduced content; and
  transmitting, via the wireless communication unit, the input command to the external server such that the input command is shared.

16. The method of claim 11, wherein the content is at least one of a video, music, or a photograph.

* * * * *